United States Patent [19]

Nakayashiki et al.

[11] Patent Number: 4,763,315
[45] Date of Patent: Aug. 9, 1988

[54] RING COMMUNICATION NETWORK SYSTEM AND A METHOD FOR CONTROLLING SAME

[75] Inventors: Susumu Nakayashiki, Yokohama; Jiro Kashio, Kawasaki; Takeshi Harakawa; Masahiro Fuse, both of Hadano, all of Japan

[73] Assignee: Hitachi, Ltd., Tokyo, Japan

[21] Appl. No.: 826,255

[22] Filed: Feb. 5, 1986

[30] Foreign Application Priority Data

Feb. 15, 1985 [JP] Japan ................................. 60-26235
Feb. 15, 1985 [JP] Japan ................................. 60-26236

[51] Int. Cl.$^4$ ............................................... H04J 3/14
[52] U.S. Cl. ........................................ 370/16; 370/15
[58] Field of Search ..................... 370/13, 15, 16, 86, 370/88

[56] References Cited

U.S. PATENT DOCUMENTS

| | | | |
|---|---|---|---|
| 4,190,821 | 2/1980 | Woodward | 370/16 |
| 4,370,744 | 1/1983 | Hirano et al. | 370/16 |
| 4,530,085 | 7/1985 | Hamada et al. | 370/15 |
| 4,542,496 | 9/1985 | Takeyama et al. | 370/16 |
| 4,553,233 | 11/1985 | Debuysscher et al. | 370/16 |

FOREIGN PATENT DOCUMENTS 2133952 8/1984 United Kingdom ................. 62/115

OTHER PUBLICATIONS

WO85/02078, 5-9-85, Beale et al., Int. Application Published Under PCT.

Primary Examiner—Douglas W. Olms
Attorney, Agent, or Firm—Antonelli, Terry & Wands

[57] ABSTRACT

In a communication network having a plurality of stations interconnected through a double ring transmission line, a station which detects a failure in the ring transmission line sends out a failure notice data, and a station which has received the failure notice data stops the send-out of its own data and relays the received data. A station which cannot receive the failure notice data loops back and transmission line to form a closed ring transmission line which bypasses a failure location.

12 Claims, 3 Drawing Sheets

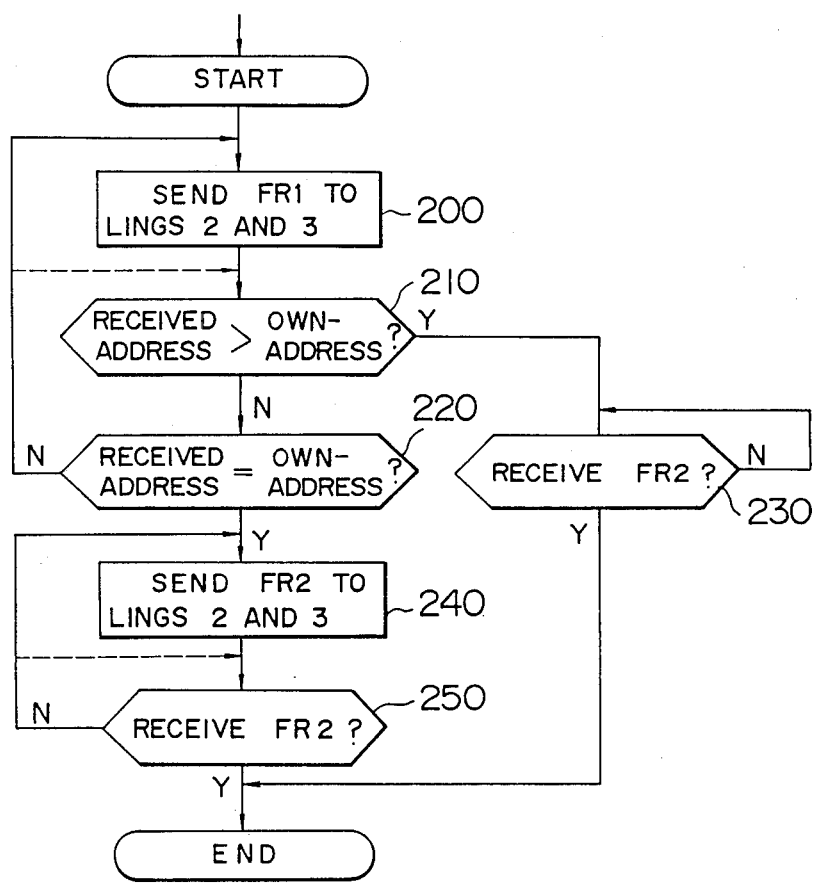

RING COMMUNICATION NETWORK SYSTEM AND A METHOD FOR CONTROLLING SAME

BACKGROUND OF THE INVENTION

The present invention relates to a method for controlling a ring network, and more particularly to a method for controlling stations in response to occurrence of a failure in a communication network system including stations connected by a double-ring transmission path.

In a ring or loop network system in which a plurality of stations are coupled by a pair of ring transmission lines having opposite directions of signal transmission, data is normally transmitted among the stations through one of the transmission lines and the other transmission line is used for backup purposes. If a failure occurs in the transmission line or one of the stations in such a ring network, the transmission line is switched to the backup line, or the signal is returned from one transmission line to the other transmission line between two stations adjacent to a trouble location so that the data is transmitted by bypassing the trouble location.

In a system shown in "Design and Performance of 100 Mb/s Optical Accessing Loop Network", Nippon Communication Association Technical Report, Vol 84, No. 214, SE84-102 (Nov. 30, 1984), pages 31-36, in order to reconfigure the transmission line such as switching of the transmission line or formation of a loop-back path, the network is constructed to include one center station (CS) and a plurality of remote stations (RS), and when an error is detected in the transmission line, the CS instructs the loop-back to all RS's. The loop-back instruction frame is simultaneously sent to the two transmission lines. When the RS receives the instruction, it relays the frame to the next station on the same transmission line as the incoming line and also forms a loop-back path from that transmission line to the other transmission line to send out the same frame to the other transmission line. When the RS receives the loop-back instruction frames from both transmission lines, it releases the loop-back path. As a result, only the two RS's adjacent to the error location hold the loop-back paths. Another system in which the center station CS is provided to control the network configuration is disclosed in Japanese Unexamined Patent Publication No. 59-154843. In such systems, if an error occurs in the center station CS, the control of the network configuration is disabled. Therefore, a backup for the center station CS has to be provided.

On the other hand, the article, "A highly reliable distributed loop network architecture" by A. Grnaroy, L. Kleinrock and M. Gerla, disclosed at the 10th International Symposium on Fault Tolerant Computing, Oct. 1-3, 1980, proposes a system in which a center station CS is not provided but all stations ST in the network have an equal role so that the reconfiguration of the network is equally and distributedly controlled by all stations ST. In this system, the backup of the center station is not necessary. However, the following point should be taken into account. When an error occurs, it destroys its own communication function. the time required to check for errors differs from station to station depending on the presence or absence of a problem and the degree of the problem thereof and the number of communication means (e.g. external interfaces) involved. Since the stations ST are connected in series in the ring network, the counter measures for the error (e.g. reconfiguration of the ring) must be effected with all stations ST being is synchronism. That is, when the network performs an overall operation (e.g. reconfiguration), all stations ST must be in synchronism with the operation. If any one of the stations ST is not in synchronism, it appears as an error to other stations ST.

SUMMARY OF THE INVENTION

It is an object of the present invention to provide an improved method for controlling stations in order to reconfigure a network upon occurrence of failure in the network including a plurality of stations interconnected in a loop or ring configuration via a double-ring transmission line.

It is another object of the present invention to provide a method for controlling stations in order to reconfigure a network, such as in a ring or loop network system in which all stations have an equal role.

It is other object of the present invention to provide a method for controlling stations upon occurrence of failure, such as, in a ring or loop network system in which stations operate asynchronously.

In order to achieve the above objects, in accordance with the present invention, each of the stations ST in a network, coupled by a double-ring transmission line, sends out a failure notice frame (beacon: BCN) to a transmission line (first ring) currently being used upon detection of the failure. When the station ST receives the BCN from any other station ST, it relays BCN to the next station ST on the same transmission line, and if that next station is in a BCN send mode, it releases the mode and returns to a normal mode. Thus, even after all stations ST which are normally connected to the upstream adjacent stations on the first ring have returned to the normal mode, only one station ST which is downstream adjacent to the fault location still maintains the BCN send mode. Thus, that station can recognize, a predetermined time after the send-out of the BCN, that is should perform loop-back of the transmission line to recover the failure.

In the double-ring network, a pair of loop-backs, a first loop-back from a backup second ring to a first ring being currently used and a second loop-back from the first ring to the second ring, on the opposite sides of the failure point are necessary. The station ST designated by the send-out of the BCN to the first ring carries out the first loop-back. In order to designate a station ST which should carry out the second loop-back, the stations ST which received the BCN from the first ring send out new BCN to the second ring.

The BCN sent out to the first ring is represented by BCN1 and the BCN sent out to the second ring is represented by BCN2. The stations ST which received the BCN1 relay BCN1 on the first ring and send out BCN2 to the second ring. The station ST which is in the BCN1 send mode does not relay the BCN2 even if it receives the BCN2 from the other station ST. As to the BCN2, each station ST returns to the normal mode form the BCN2 send mode when it receives the BCN2 from the upstream station ST. Thus, only the station ST which is immediately downstream adjacent to the failure point on the second ring maintains the BCN2 send mode and hence that station ST carries out the second loopback.

In the reconfiguration of the network, if the stations ST are equally distributedly controlled, it is uncertain which one of the stations ST on the network first starts the failure recovery. Each station ST detects the failure in the transmission line if a message which each station sent does not come back through the loop within a predetermined time. There is no specific relation between the station ST which first detects the failure and the failure location.

In accordance with the present invention, in order to make all stations ST start the failure recovery operation simultaneously, the station ST which has detected the failure in the first ring currently being used sends out the failure notice frame to the first and second rings.

If the frame is sent out only to the first ring, the failure notice frame is not transmitted to the stations ST which are located downstream of the failure location and are located upstream of the station ST which first detected the failure. Accordingly, those stations which could not receive the failure notice frame do not start the failure recovery operation until they detect the failure themselves. Consequently, the stations ST on the same network asynchronously start the failure recovery operation. If the failure notice frame is sent out to both the first and second rings, the frame can be transmitted to all stations ST whichever station the sending station maybe, and a time difference between the failure recovery start times of the respective stations is within a range of the propagation delay time of the failure notice frame.

In the normal mode, the stations ST operate asynchronously from with respect to each other. Accordingly if a failure occurs on the network, it may be simultaneously detected by a plurality of stations ST, which send out the failure notice frames to the ring. In such a case, in order to determine only one station ST which coordinates the overall network, identification information for the sending station ST, for example, an address is contained in the failure notice frame. If the station ST which has sent out the failure notice frame receives a failure notice frame having a larger identification information than its own, that station relays it and cancels the failure notice frame send mode. As a result, only the station ST which has the largest identification information can continue the send-out of the failure notice frame. This station ST may be designated as a controlling station ST to synchronize all stations ST on the network. Thus, the stations can synchronously send the beacon BCN1 to reconfigure the network in accordance with the instruction from the controlling station ST.

When the stations on the network are synchronized, a self-diagnosis operation in which each station ST temporarily cuts off the first and second rings in order to diagnose the status of branch lines for the terminals can be carried out, and after the execution, the network may be reconfigured.

The foregoing and other objects, advantages, manners of operation and novel features of the present invention will be understood from the following detailed description when read in connection with the accompanying drawings.

BRIEF DESCRIPTION OF THE DRAWINGS

FIG. 5 shows a control procedure to synchronize stations in the network.

DESCRIPTION OF THE PREFERRED EMBODIMENTS

Figure 1:
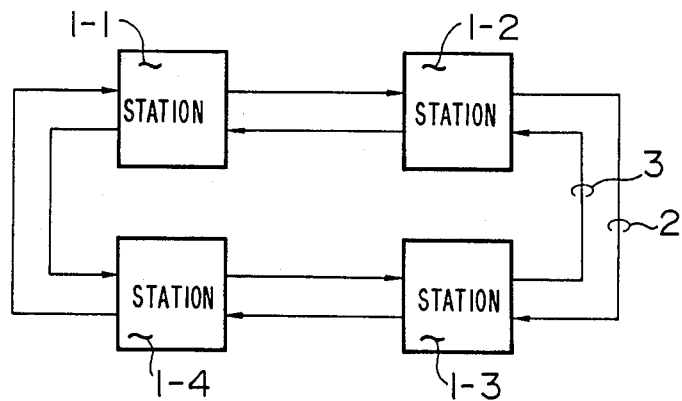
FIG. 1 shows an overall configuration of a network system.

FIG. 1 shows a schematic view of a communication system for embodying the present invention. Stations 1-1, . . . 1-4 are connected in a ring or loop configuration by a first transmission line 2 which is normally used and a second transmission line 3 which is provided for backup purposes. The function of the system is to exchange or distribute data among or to the stations ST.

Figure 2:
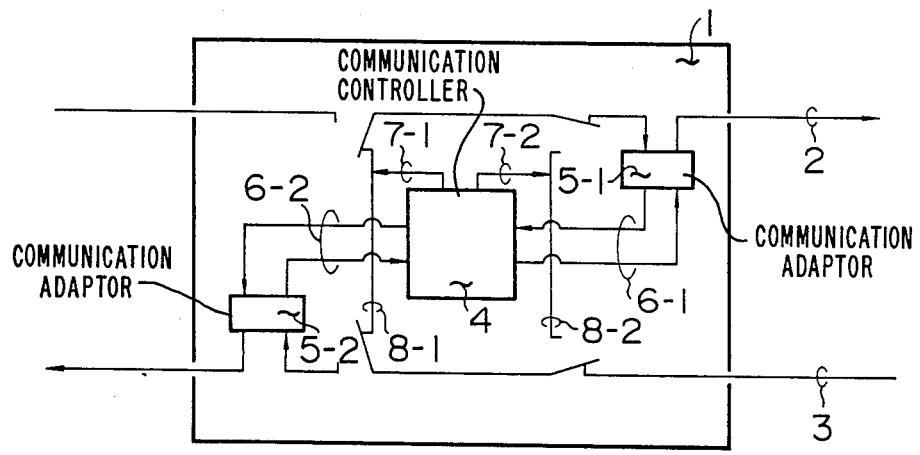
FIG. 2 shows a configuration of a station.

FIG. 2 shows a configuration of the station ST. Ring communication adaptors 5-1 and 5-2 function to send communication frames delivered from a communication controller 4 through signal lines 6-1 and 6-2 to the transmission lines 2 and 3, and receive the communication frames addressed to their own stations and deliver them to the communication controller 4 through the signal lines 60 and 6-2. Loop-back of the transmission lines by control signals on signal lines 7-1 and 7-2 includes a first loop-back from the second transmission line 3 to the first transmission line 2, and a second loop-back from the first transmission line 2 to the second transmission line 3. A switch 8-1 is used for the first loop-back and a switch 8-2 is used for the second loop-back. FIG. 2 shows the first loop-back status.

Figure 3:
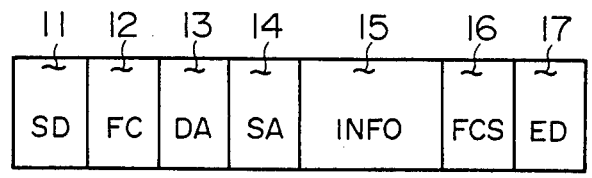
FIG. 3 shows a format of a communication frame.

FIG. 3 shows a format of a communication frame used to control reconfiguration of the network. Numeral 11 denotes a start delimiter (SD) to indicate a beginning of the frame, numeral 12 denotes a frame control (FC) to indicate a type of the frame, numeral 13 denotes a destination address (DA), numeral 14 denotes a source address (SA), numeral 15 denotes information (INFO), numeral 16 denotes a frame check sequence (FCS) and numeral 17 denotes an end delimiter (ED). The following frame is used to determine a station which is to carry out a failure recovery operation. (FC 12 is one-byte information.)

FC 12: B'01000100' - - - (BCN1)

FC 12: B'01000101' - - - (BCN2)

Other FC's are used for other than the failure notice frame. The BCN1 is sent out only to the first transmission line 2, and the BCN2 is sent out only to the second transmission line 3. The DA 13 is addressed to all stations ST (broadcast). The INFO 15 may includes a transmission serial number, although it is not used in the present embodiment.

Figure 4:
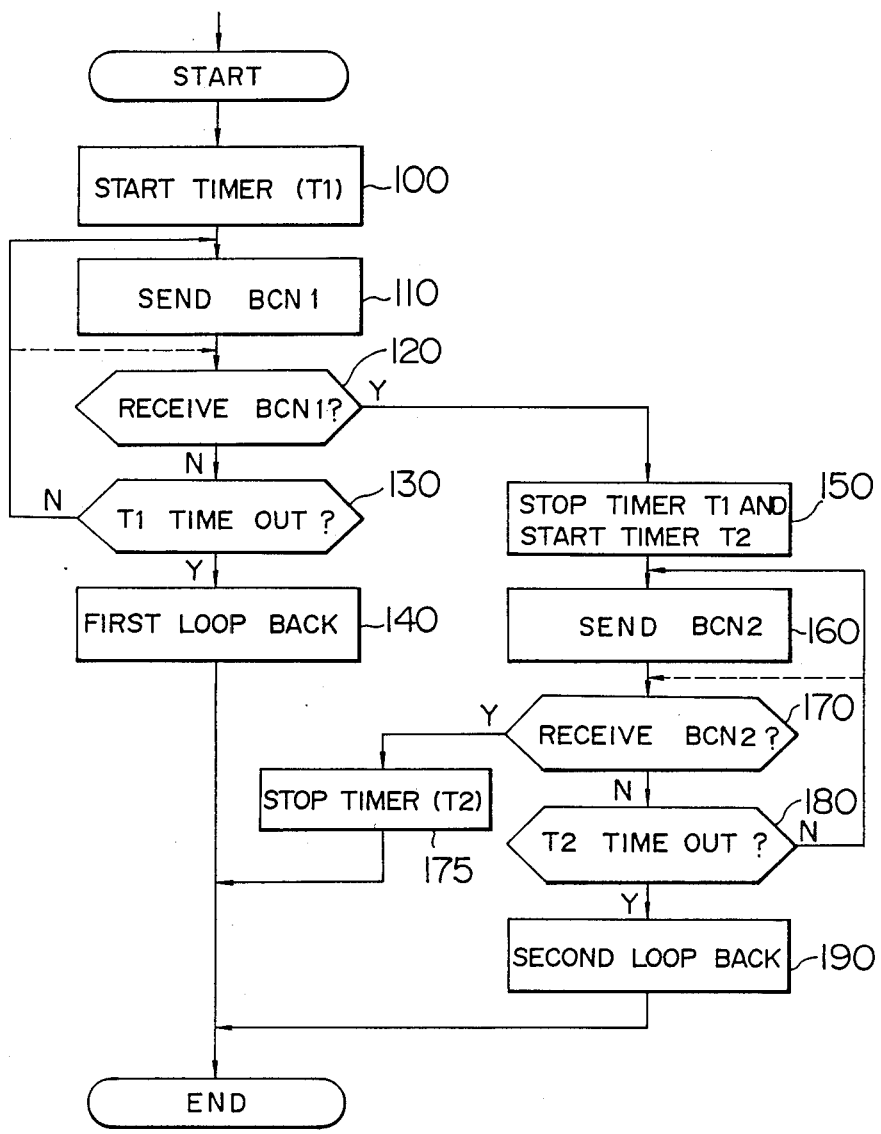
FIG. 4 shows a control procedure to reconfigure the network.

FIG. 4 shows a flow chart of an operation procedure of the station ST when the ring is to be reconfigured. When the station ST detects a failure in the first transmission line 2, it starts a BCN1 reception monitor timer T1 in a step 100. In a step 110, it sends out the BCN1 to the first transmission line 2, and in a step 120, it monitors the reception of the BCN1 (BCN1 send mode). It repeats the send-out of the BCN1 until the T1 times out in a step 130. When the T1 times out, the station determines in a step 140 that the failure is immediately upstream of the station (that is, the station is the furthest upstream station in the first transmission line 2 with reference to the failure location), and carries out the first loopback.

If the station receives the BCN1 before the T1 times out, the station stops the T1 in a step 150 and cancels the BCN1 send mode and starts a BCN2 reception monitor timer T2. In a step 160, the station sends out the BCN2 to the second transmission line 3, and in a step 170, it monitors the reception of the BCN2 (BCN2 send mode). It repeats the send-out of the BCN2 until the T2 times out in a step 180. When the T2 times out, the station carries out the second loop-back in a step 190. If the station receives the BCN2 before the T2 times out, it stops the T2 in a step 175 and cancels the BCN2 send mode to terminate the routine. In this manner, the ring is reconfigured.

In the above embodiment, when the station is in the BCN1 (or BCN2) send mode, the BCN1 (or BCN2) is repeatedly sent out. The BCN1 (or BCN2) may be sent out only once by changing a procedure as shown by a broken line in FIG. 4.

FIG. 5 shows an operation procedure of synchronization control which is carried out prior to the ring reconfiguration. The content of the FC 12 in FIG. 3 is set as follows to represent a frame (FR1) to notice the occurrence of a synchronization event and a frame (FR2) to instruct the start of the control operation.

FC 12: B'01000110' - - - (FR1)

FC 12: B'01000111' - - - (FR2)

When the station ST detects the failure in a step 200, it sends out the FR1 to the first and second transmission lines 2 and 3. In a step 210, it compares identification information (SA 14) of the received FR1 with identification information of its own station ST, and if the identification information of the received FR1 is larger, it stops to send out the FR1 and waits for the FR2 (step 230). The above operation is repeated until the station receives the FR1 whose identification information is equal to the identification information of its own (step 220). When the station receives the FR1 whose identification is equal to that of its own, the station sends out the FR2 to both transmission lines in a step 240. By that time, all stations ST have received the FR1 and are waiting for the reception of the FR2 (step 250). When the station receives the FR2, it starts the failure recovery operation. A difference between the times to start the failure recovery operations in the respective stations is within a propagation delay time of the FR2 through the ring.

The operation of the station ST which detected the failure has been described above. When one station detects the failure, some other station may not yet have detected the failure. When the station ST which has not detected the failure receives the FR1, it waits for the reception of the FR2 (step 230). As a result, if the plurality of stations ST do not concurrently detect the failure, there is no competition and the station ST which first detected the failure is a coordinating station to coordinate the overall system. Accordingly, all stations ST can simultaneously start to send out the BCN1 or carry out the internal diagnosis operation in response to the first reception of the FR2. If the failure location can be bypassed within the station through the internal diagnosis, the network can be configured without loop-back in the loop check by the sendout of the BCN1 and BCN2.

In the above embodiment, the FR2 is used for the following reason. If the plurality of stations ST simultaneously send out the FR1, there is a competition to determine which one of the stations ST is to coordinate the overall system. Each station may start the failure recovery operation as soon as it receives the FR1 sent from its own station or other station. In this case, however, the competition time is included in the time difference between synchronization of the stations. By using the FR2, the inclusion of the competition time into the synchronization time difference is avoided. The stations ST other than the station ST having the largest identification information designation are synchronized in the reception state and then the intended operation is started. As a result, the synchronization time difference between the stations is within the propagation delay time of the FR2 through the ring.

In the above embodiment, the synchronization for the failure recovery operation for one failure has been described. In the dual (normal use and backup use) ring, the communication frame is always circulated through the ring when the failure is at one location. If there are failure at more than one location, the communication frame may not be circulated through the ring. In this case, the synchronization is attained by adding a timer monitor (timer to monitor the circulation of the FR1 and FR2 through the ring) to the above embodiment. The station ST which first times out the timer corresponds to the station in the above embodiment which first detects the failure.

The sendout of the FR1 and FR2 may be effected only once as shown by a broken line in FIG. 5.

We claim:

1. A method for controlling a plurality of stations in a communication network system in which the stations are interconnected through first and second ring transmission lines which transmit signals in opposite signal transmission directions relative to each other, comprising the steps of:

sending out at least one failure notice frame downstream in the direction of signal transmission via said first transmission line from one of said stations which detects a failure in said first transmission line and setting said one station in a failure notice frame waiting mode in which said one station operates to wait for the receipt of the failure notice frame via said first transmission line on its upstream side while stopping re-transmission of a received signal on said second transmission line;

relaying the failure notice frame received by each station from said first transmission line to a next downstream adjacent station through said first transmission line and returning the operation mode of the station which receives the failure notice frame to a normal mode if the station has been set in said failure notice frame waiting mode; and forming a loop-back path from said second transmission line to said first transmission line at a station which is in said failure notice frame waiting mode when the failure notice frame sent from that station is not received from said first transmission line by that station within a predetermined time period after the station was set in said failure notice frame waiting mode.

2. A method according to claim 1, further comprising the steps of:

sending out another notice frame to said second transmission line from each station when each station receives said failure notice frame from said first transmission line an setting each such station in another notice frame waiting mode in which the time period for waiting to receive said another notice frame from said second transmission line is measured independently of the subsequent reception of said failure notice frame from said first transmission line;

relaying said another notice frame by each station, except the station in said failure notice frame waiting mode, through said second transmission line and returning the operation mode of each station to a normal mode when said another notice frame is received from said second transmission line; and forming a loop-back path from said first transmission line to said second transmission line by the station which is in said another notice frame waiting mode if said another notice frame is not received from said second transmission line before the end of said measured time period.

3. A method for controlling a plurality of stations in a communication network system in which the stations are interconnected through first and second ring transmission lines which transmit signals in opposite signal transmission directions relative to each other, comprising the steps of:

sending out a first frame synchronously to said first and second transmission lines from one of said stations which detects a failure in the first transmission line;

sending out a second frame to indicate the failure to said first transmission line when the station receives said first frame which it has sent out and setting the station in a failure notice frame waiting mode for said first transmission line in which the station monitors the receiving of said second frame from said first transmission line while preventing the relaying of a communication frame to said second transmission line;

relaying said second frame received by each station from said first transmission line to a downstream adjacent station in the direction of transmission on said first transmission line, sending out said second frame to said second transmission line and setting each station which relays said second frame in a failure notice frame waiting mode for said second transmission line;

relaying said second frame by each station to said second transmission line and returning each station to a normal mode from said failure notice frame waiting mode for said second transmission line when said second frame is received from said second transmission line if the station is not in the failure notice frame waiting mode for said first transmission line;

forming a loop-back path from said second transmission line to said first transmission line at one of the stations in which the failure notice frame waiting mode for said first transmission line lasts beyond a predetermined time period; and forming a loop-back path from said first transmission line to said second transmission line at another one of the stations in which the failure notice frame waiting mode for said second transmission line lasts beyond a predetermined time period.

4. A method according to claim 3, further comprising the step of:

setting each station in a third frame waiting mode if said first frame received includes station identification information having a higher priority than that provided for that station, and sending out said third frame to said first and second transmission lines to instruct the start of a synchronous operation if the first frame sent from that station is received before the first frame having the higher priority station identification information is received, wherein said second frame is sent out to said first transmission line in response to the reception of said third frame in place of said first frame.

5. A method for controlling a plurality of stations in a communication network system which comprises first and second ring transmission lines having opposite signal transmission directions relative to each other, comprising the steps of:

operating any one of the stations such that upon detecting a failure in said first transmission line, the station sends out at least one notice signal along said first transmission line and waits to receive back said notice signal from said first transmission line while preventing a received signal from being relayed by that station on said second transmission line;

operating each station to relay the notice signal to a downstream station via said first transmission line when each said station receives said notice signal from said first transmission line and to return the station to a normal operation mode if the station which receives said notice signal is in a waiting mode for said notice signal; and operating the station which is in said waiting mode to form a transmission path from said second transmission line to said first transmission line if the notice signal is not received from said first transmission line within a predetermined time period after the station began to wait for said notice signal.

6. A method according to claim 5, further comprising the steps of:

sending out from each station, except the station operating in said notice signal waiting mode, in response to said notice signal, at least one other notice signal to said second transmission line and waiting to receive back said other notice signal from said second transmission line within a predetermined time period after the station receives said notice signal from said first transmission line, said other notice signal waiting mode occurring during the predetermined time period and independent of any further notice signal received from said first transmission line;

relaying from each station, except the station operating in said notice signal waiting mode, in response to receiving said other notice signal from upstream via said second transmission line, the received said other notice signal downstream via said second transmission line and returning to a normal operation mode if the station is operating in said other notice signal waiting mode; and in the station which is in said other notice signal waiting mode, forming a transmission path from said first transmission line to said second transmission line if said other notice signal is not received from said second transmission line within the predetermined time period after the station began to wait for said other notice signal.

7. A method according to claim 6, wherein each station in said other notice signal waiting mode sends out said other notice frame repeatedly until the station receives said other notice signal from said second transmission line.

8. A communication network system comprising:

a first transmission line having a first signal transmission direction;

a second transmission line having a second signal transmission direction opposite said first signal transmission direction; and a plurality of stations operatively connected through said first and second transmission lines;

each of said stations including;

means for operating the station in a first mode by sending out at least one notice signal along said first transmission line while stopping signal relay operation on said second transmission line for a predetermined time period in response to detecting a failure in said first transmission line;

means for operating the station to relay a notice signal received from an upstream adjacent station to a downstream adjacent station relative to said first signal transmission direction on said first transmission line and for returning the operation mode of the station to a normal mode if the station is in said first mode when said notice signal is received from said first transmission line;

means for detecting that a notice signal sent out by the station has not been received by that station from said first transmission line within said predetermined time period when the station is in said first mode and for forming a first transmission path from said second transmission line to said first transmission line in response thereto; and means for detecting an abnormality in said second transmission line and for forming a second transmission path from said first transmission line to said second transmission line.

9. A communication network system according to claim 8, wherein said second transmission path forming means comprises:

means for operating the station in a second mode by sending out at least another notice signal downstream relative to said second signal transmission direction along said second transmission line and waiting to receive said another notice signal from an upstream location along said second transmission line for a predetermined time period from the time the station receives said notice signal from said first transmission line, inlcuding means for measuring said predetermined time period from the first reception of said notice signal and independently of any subsequently received notice signals from said first transmission line;

means for operating the station to relay a said another notice signal received from an upstream adjacent station to a downstream adjacent station on said second transmission line and for returning the operation mode of the station to a normal mode if the station is in said second mode when said another notice signal is received from said second transmission line; and means for detecting that said another notice signal has not been received via said second transmission line upstream location within said predetermined time period when the station is in said second mode.

10. A method for controlling a plurality of stations in a communication system which comprises first and second ring transmission lines for connecting said stations and for providing opposite signal transmission directions, comprising the steps of:

operating said stations such that any station when detecting a failure present in said first transmission line sends out a notice signal downstream along said first transmission line while stopping the transmission of a signal on said second transmission line, and waits for the return of said notice signal via said first transmission line on the respective station's upstream side; and one of said stations which receives said notice signal from the first transmission line forms a transmission path from said first transmission line to said second transmission line when said station detects an effective failure of signal transmission on said second transmission line resulting from the station which detected the failure in said first transmission line stopping the transmission of the signal on said second transmission line.

11. A method according to claim 10, further comprising the step of:

each station relaying said notice signal to a downstream station via said first transmission line when the station receives said notice signal from said first transmission line on its upstream side and returns the station to a normal operating state if the station is in said notice signal waiting state.

12. A method according to claim 11, further comprising the steps of:

in response to receiving said notice signal from said first transmission line, each station, except the station waiting for said notice signal from said first transmission line, sending another notice signal downstream via said second transmission line and waiting to receive it from said second transmission line on its upstream side; and in response to receiving said another notice signal from said second transmission line, each station, except the station waiting for said notice signal from said first transmission line, relays said another notice signal downstream via said second transmission line when it is received from said second transmission line and returns said station to a normal operation state if that station is in said another notice signal waiting state.

* * * * *